United States Patent [19]

Uzawa

[11] Patent Number: 5,175,649
[45] Date of Patent: Dec. 29, 1992

[54] ZOOM LENS SYSTEM

[75] Inventor: Tsutomu Uzawa, Tokyo, Japan

[73] Assignee: Olympus Optical Co., Ltd., Tokyo, Japan

[21] Appl. No.: 677,445

[22] Filed: Mar. 29, 1991

[30] Foreign Application Priority Data

Mar. 30, 1990 [JP] Japan .................................. 2-81028

[51] Int. Cl.$^5$ .......................................... G02B 15/177
[52] U.S. Cl. ................... 359/691; 359/676; 359/682; 359/753
[58] Field of Search ............... 359/676, 683, 691, 680, 359/682, 740, 753

[56] References Cited

U.S. PATENT DOCUMENTS 4,198,128 4/1980 Ogino .................................. 359/682
4,540,249 9/1985 Mogami ............................ 359/680

FOREIGN PATENT DOCUMENTS 55-62420 5/1980 Japan .
56-123512 9/1981 Japan .

Primary Examiner—Bruce Y. Arnold
Assistant Examiner—James Phan
Attorney, Agent, or Firm—Cushman, Darby & Cushman

[57] ABSTRACT

A zoom lens system comprising, in the order from the object side, a front lens unit having a negative refractive power as a whole and a rear lens unit having a positive refractive power as a whole; and said rear lens unit comprising a first positive lens element, a second positive lens element having a convex surface on the image side, a third biconcave lens element and a fourth biconvex lens element, and the second lens element and the third lens element being cemented to each other so as to compose a cemented doublet, adapted so as to perform variation of focal length by varying the airspace reserved between said front lens unit and said rear lens unit.

6 Claims, 11 Drawing Sheets

ZOOM LENS SYSTEM

BACKGROUND OF THE INVENTION a) Field of the invention:

The present invention relates to a zoom lens system, and more specifically to a zoom lens system which is designed for use with cameras employing electronic image pickup devices.

b) Description of the prior art

Along with the recent trend to manufacture compact, light-weight domestic video cameras at low costs, efforts are being made to develop compact, light-weight photographic lens systems which can be manufactured at reduced cost.

As compact zoom lens systems which have simple compositions and designed for use with silver salt cameras, there are known, for example, the zoom lens systems proposed by Japanese Patent Kokai Publication No. Sho 55-62420 and Japanese Patent Kokai Publication No. Sho 56-123512.

Each of these conventional zoom lens systems consists, in the order from the object side, of a first lens unit having a negative refractive power as a whole and a second lens unit having a positive refractive power as a whole. This type of zoom lens system allows the optical performance thereof to be remarkably degraded by eccentricity of the lens elements composing the lens units since the axial ray is high on the second lens unit, especially at the tele position. The zoom lens system proposed by Japanese Patent Kokai Publication No. Sho 56-123512 adopts a cemented doublet in the second lens unit to prevent the lens component from being eccentric at the stage of assembly into a barrel.

Both of the conventional zoom lens systems are designed for use with film camera and it is necessary, for using these zoom lens systems with video cameras, to locate the exit pupils of the lens systems sufficiently far from the image surfaces. If the exit pupils of the zoom lens systems are not located sufficiently far from the image surfaces, rays will have large angles of incidence and be vignetted on the marginal portions of the image surface due to the structure inherent in the image pickup devices, thereby producing an undesirable effect to degrade sensitivity at the marginal portions of the image surfaces.

SUMMARY OF THE INVENTION

A primary object of the present invention is to provide a zoom lens system which has a field angle on the order of 46° at the wide position thereof, a vari-focal ratio on the order of 1.6 to 2, an exit pupil located sufficiently far from the image surface, a simple composition and favorable optical performance.

In order to accomplish the above-mentioned object, the zoom lens system according to the present invention comprises, in the order from the object side, a front lens unit having a negative refractive power as a whole and a rear lens unit having a positive refractive power as a whole, and adapted so as to perform variation of focal length by varying an airspace reserved between the front lens unit and the rear lens unit; said rear lens unit comprising, in the order from the object side, a first positive lens element, a second positive lens element having a convex surface on the image side, a third biconcave lens element and a fourth biconvex lens element, said second lens element and said third lens element being cemented to each other, and said rear lens unit being designed so as to satisfy the following condition (1):

$$0.16 < D/f_{II4} < 0.7 \tag{1}$$

wherein the reference symbol D represents the airspace reserved between the third lens unit and the fourth lens unit which are arranged in the rear lens unit, and the reference symbol $f_{II4}$ designates the focal length of the fourth lens element arranged in the rear lens unit.

In the zoom lens system according to the present invention, the positive lens element arranged as the second lens element and the negative lens element arranged as the third lens unit in the rear lens unit are cemented to each other so as to compose a single cemented doublet since sharpness of image is adversely influenced by eccentricity especially of these lens elements. Accordingly, these lens elements cannot be eccentric from each other at the stage to assemble the cemented doublet into a lens barrel. Further, the zoom lens system according to the present invention is designed so as to locate the exit pupil thereof sufficiently far from the image surface not only by reserving a sufficiently wide airspace between the cemented doublet and the fourth positive lens element, but also by selecting an adequate refractive power for said fourth lens element. The condition (1) has been adopted for defining said airspace and the refractive power of the fourth lens element so as to locate the exit pupil sufficiently far from the image surface.

If the lower limit of the condition (1) is exceeded, it will be impossible to locate the exit pupil sufficiently far from the image surface. If the upper limit of the condition (1) is exceeded, in contrast, negative distortion and astigmatism will be increased undesirably.

In addition, it is desirable to modify the condition (1) so as to have a lower limit of 0.19.

Further, it is more desirable to design the rear lens unit of the zoom lens system according to the present invention so as to satisfy the following condition (2):

$$0.87 < l_{II}/f_{II} < 1.6 \tag{2}$$

wherein the reference symbol $l_{II}$ represents the distance as measured from the object side surface of the first lens element to the image side surface of the fourth lens element arranged in the rear lens unit and the reference symbol $f_{II}$ designates the focal length of the rear lens unit.

The condition (2) is required for correcting the axial aberrations and the offaxial aberrations with good balance. If the lower limit of this condition is exceeded, spherical aberration will be overcorrected at the tele position of the zoom lens system according to the present invention. If the upper limit of the condition (2) is exceeded, the meridional image surface will be inclined toward the positive side and the total length of the zoom lens system will be prolonged undesirably.

Moreover, it is further desirable for the zoom lens system according to the present invention to design the rear lens unit thereof so as to satisfy the following condition (3):

$$-0.8 = (r_b + r_a)/(r_b - r_a) < 1 \tag{3}$$

wherein the reference symbols $r_a$ and $r_b$ represent the radii of curvature of the object side surface and the image side surface respectively of the fourth lens element arranged in the rear lens unit.

The condition (3) defines the shape of the fourth lens element arranged in the rear lens unit and is related mainly to correction of astigmatism. If the lower limit of the condition (3) is exceeded, the meridional image surface will be inclined undesirably toward the negative side. If the upper limit of the condition (3) is exceeded, in contrast, the meridional image surface will undesirably be inclined toward the positive side.

In the zoom lens system according to the present invention, an aperture stop is arranged on the object side of the rear lens unit or between the first lens element and the second lens element of the rear lens unit as described later with reference to embodiments of the present invention. When the aperture stop is arranged between the first lens element and the second lens element, a mechanical stop control mechanism cannot be used and the aperture ratio of the zoom lens system is determined by the outside diameter of the lens elements or the lens barrel. When the aperture stop is arranged on the object side of the rear lens unit, a mechanical stop control mechanism may or may not be arranged. In addition, an aperture stop control mechanism can be arranged between the first lens element and the second lens element when a liquid crystal aperture stop is selected for use with the zoom lens system according to the present invention.

DETAILED DESCRIPTION OF THE PREFERRED EMBODIMENTS

Figure 1:
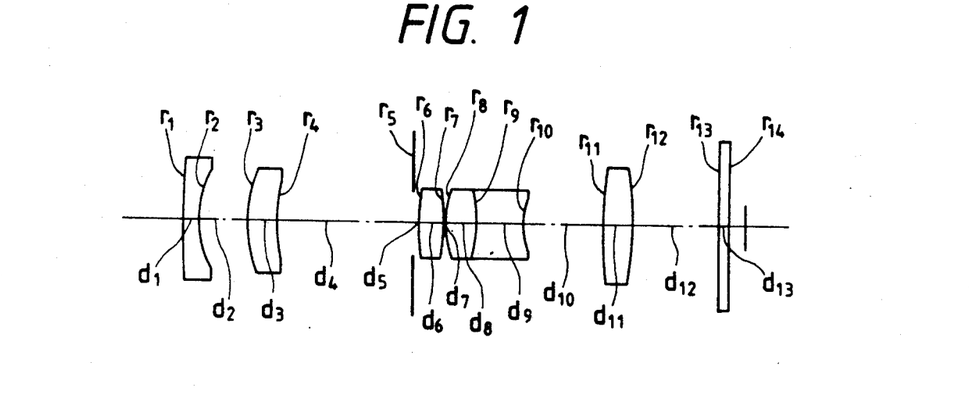
FIG. 1 through FIG. 6 show sectional views illustrating compositions of Embodiments 1 through 6 of the zoom lens system according to the present invention.

Now, the present invention will be described in more detail below with reference to the preferred embodiments illustrated in the accompanying drawings and given in the form of the following numerical data:

Embodiment 1
$f = 10 \sim 20$ mm.  F/5.1~F/7.1  $2\omega = 46° \sim 24°$ $r_1 = 202.7554$
$\quad d_1 = 1.0000 \quad n_1 = 1.77250 \quad v_1 = 49.66$ -continued

Embodiment 1
$f = 10 \sim 20$ mm.  F/5.1~F/7.1  $2\omega = 46° \sim 24°$ $r_2 = 6.9987$
$\quad d_2 = 3.1377$
$r_3 = 9.6033$
$\quad d_3 = 1.9000 \quad n_2 = 1.80518 \quad v_2 = 25.43$
$r_4 = 13.7811$
$\quad d_4 = D_1$ (variable)
$r_5 = \infty$ (pupil)
$\quad d_5 = 0.2000$
$r_6 = 16.2793$
$\quad d_6 = 1.6000 \quad n_3 = 1.79952 \quad v_3 = 42.24$
$r_7 = -16.3270$
$\quad d_7 = 0.2000$
$r_8 = 7.1862$
$\quad d_8 = 2.0084 \quad n_4 = 1.57309 \quad v_4 = 42.57$
$r_9 = -10.6807$
$\quad d_9 = 3.1905 \quad n_5 = 1.80518 \quad v_5 = 25.43$
$r_{10} = 5.2658$
$\quad d_{10} = 5.2621$
$r_{11} = 26.3973$
$\quad d_{11} = 1.9000 \quad n_6 = 1.56732 \quad v_6 = 42.83$
$r_{12} = -25.2972$
$\quad d_{12} = D_2$ (variable)
$r_{13} = \infty$
$\quad d_{13} = 0.6000 \quad n_7 = 1.51633 \quad v_7 = 64.15$
$r_{14} = \infty$

| f | W | S | T |
|---|---|---|---|
| $D_1$ | 9.242 | 4.532 | 1.000 |
| $D_2$ | 5.629 | 9.062 | 14.212 |

$D/f_{II}4 = 0.23, \quad 1_{II}/f_{II} = 1.19$
$(r_b + r_a)/(r_b - r_a) = -0.02$ angle of incidence of principal ray on image surface at maximum field angle $11.3° \sim 8.0°$

Figure 2:
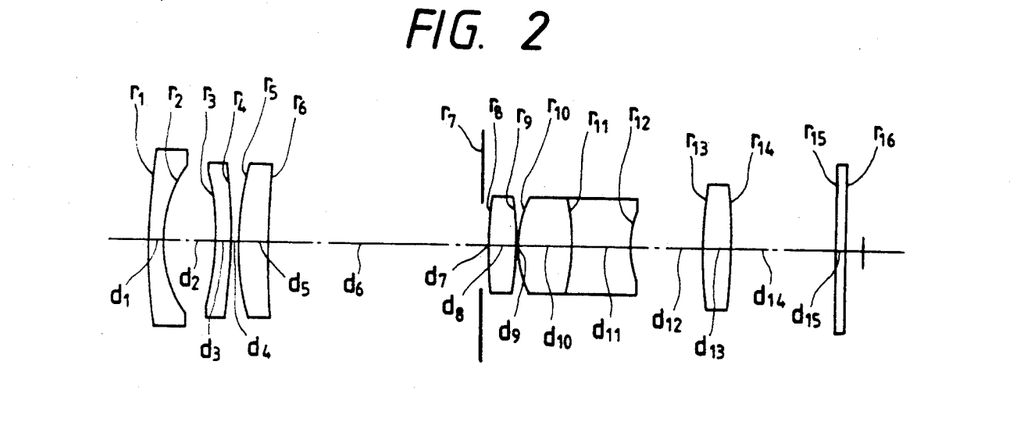

Embodiment 2
$f = 10 \sim 20$ mm.  F/4~F/5.2  $2\omega = 46° \sim 24°$ $r_1 = 33.9736$
$\quad d_1 = 1.0000 \quad n_1 = 1.77250 \quad v_1 = 49.66$
$r_2 = 8.7883$
$\quad d_2 = 3.3864$
$r_3 = -19.3166$
$\quad d_3 = 1.0000 \quad n_2 = 1.77250 \quad v_2 = 49.66$
$r_4 = -45.3282$
$\quad d_4 = 0.4463$
$r_5 = 18.6458$
$\quad d_5 = 1.9000 \quad n_3 = 1.80518 \quad v_3 = 25.43$
$r_6 = 55.1394$
$\quad d_6 = D_1$ (variable)
$r_7 = \infty$ (pupil)
$\quad d_7 = 0.2000$
$r_8 = 23.7703$
$\quad d_8 = 1.9000 \quad n_4 = 1.75700 \quad v_4 = 47.87$
$r_9 = -23.9609$
$\quad d_9 = 0.2000$
$r_{10} = 8.1363$
$\quad d_{10} = 3.4137 \quad n_5 = 1.57309 \quad v_5 = 42.57$
$r_{11} = -15.2260$
$\quad d_{11} = 3.7917 \quad n_6 = 1.80518 \quad v_6 = 25.43$
$r_{12} = 6.0181$
$\quad d_{12} = 4.6489$
$r_{13} = 21.1582$
$\quad d_{13} = 1.9000 \quad n_7 = 1.77250 \quad v_7 = 49.66$
$r_{14} = -37.9616$
$\quad d_{14} = D_2$ (variable)
$r_{15} = \infty$
$\quad d_{15} = 0.6000 \quad n_8 = 1.51633 \quad v_8 = 64.15$
$r_{16} = \infty$

| f | W | S | T |
|---|---|---|---|
| $D_1$ | 14.422 | 6.752 | 1.000 |
| $D_2$ | 7.096 | 10.225 | 14.918 |

$D/f_{II}4 = 0.26, \quad 1_{II}/f_{II} = 1.09$
$(r_b + r_a)/(r_b - r_a) = 0.28$ angle of incidence of principal ray on image surface at maximum field angle 9.5°~7.3°

Figure 3:
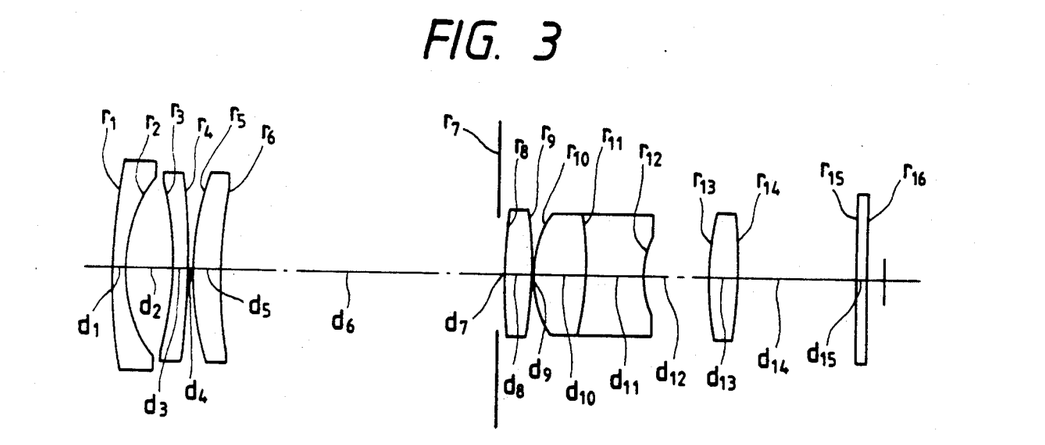

| Embodiment 3 | | | |
|---|---|---|---|
| $f = 10\sim20$ mm, F/2.8~F/3.7  $2\omega = 46°\sim24°$ | | | |
| $r_1 = 32.0139$ | | | |
| | $d_1 = 1.0000$ | $n_1 = 1.77250$ | $\nu_1 = 49.66$ |
| $r_2 = 10.2867$ | | | |
| | $d_2 = 3.0936$ | | |
| $r_3 = -22.2287$ | | | |
| | $d_3 = 1.0000$ | $n_2 = 1.77250$ | $\nu_2 = 49.66$ |
| $r_4 = -44.9979$ | | | |
| | $d_4 = 0.2528$ | | |
| $r_5 = 18.6731$ | | | |
| | $d_5 = 1.9000$ | $n_3 = 1.80518$ | $\nu_3 = 25.43$ |
| $r_6 = 37.4493$ | | | |
| | $d_6 = D_1$ (variable) | | |
| $r_7 = \infty$ (pupil) | | | |
| | $d_7 = 0.2000$ | | |
| $r_8 = 31.1820$ | | | |
| | $d_8 = 1.9000$ | $n_4 = 1.75700$ | $\nu_4 = 47.87$ |
| $r_9 = -28.8371$ | | | |
| | $d_9 = 0.2000$ | | |
| $r_{10} = 7.8033$ | | | |
| | $d_{10} = 3.4080$ | $n_5 = 1.57309$ | $\nu_5 = 42.57$ |
| $r_{11} = -21.0177$ | | | |
| | $d_{11} = 3.7286$ | $n_6 = 1.80518$ | $\nu_6 = 25.43$ |
| $r_{12} = 6.0963$ | | | |
| | $d_{12} = 4.2461$ | | |
| $r_{13} = 18.5700$ | | | |
| | $d_{13} = 1.9000$ | $n_7 = 1.77250$ | $\nu_7 = 49.66$ |
| $r_{14} = -32.8903$ | | | |
| | $d_{14} = D_2$ (variable) | | |
| $r_{15} = \infty$ | | | |
| | $d_{15} = 0.6000$ | $n_8 = 1.51633$ | $\nu_8 = 64.15$ |
| $r_{16} = \infty$ | | | |

| f | W | S | T |
|---|---|---|---|
| $D_1$ | 18.481 | 8.493 | 1.000 |
| $D_2$ | 7.884 | 10.521 | 14.479 |

$D/f_{II}4 = 0.27$, $l_{II}/f_{II} = 1.01$
$(r_b + r_a)/(r_b - r_a) = 0.28$ angle of incidence of principal ray on image surface at maximum field angle 9.2°~7.3°

Figure 4:
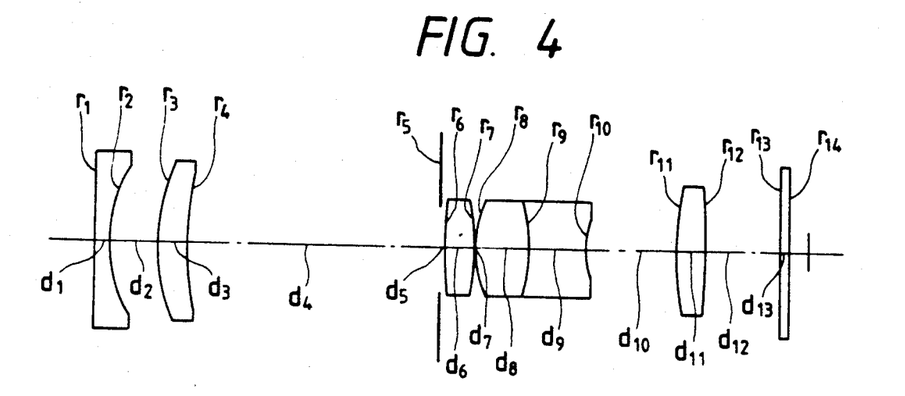

| Embodiment 4 | | | |
|---|---|---|---|
| $f = 10\sim10$ mm, F/4~F/5  $2\omega = 46°\sim24°$ | | | |
| $r_1 = 4331.5204$ | | | |
| | $d_1 = 1.0000$ | $n_1 = 1.77250$ | $\nu_1 = 49.66$ |
| $r_2 = 9.6465$ | | | |
| | $d_2 = 3.0243$ | | |
| $r_3 = 12.1915$ | | | |
| | $d_3 = 1.9000$ | $n_2 = 1.80518$ | $\nu_2 = 25.43$ |
| $r_4 = 20.0784$ | | | |
| | $d_4 = D_1$ (variable) | | |
| $r_5 = \infty$ (pupil) | | | |
| | $d_5 = 0.2000$ | | |
| $r_6 = 23.7852$ | | | |
| | $d_6 = 1.9000$ | $n_3 = 1.75700$ | $\nu_3 = 47.87$ |
| $r_7 = -21.9595$ | | | |
| | $d_7 = 0.2000$ | | |
| $r_8 = 7.9079$ | | | |
| | $d_8 = 3.4046$ | $n_4 = 1.57309$ | $\nu_4 = 42.57$ |
| $r_9 = -15.6754$ | | | |
| | $d_9 = 3.6339$ | $n_5 = 1.80518$ | $\nu_5 = 25.43$ |
| $r_{10} = 5.7775$ | | | |
| | $d_{10} = 5.6536$ | | |
| $r_{11} = 19.7842$ | | | |
| | $d_{11} = 1.9000$ | $n_6 = 1.77250$ | $\nu_6 = 49.66$ |
| $r_{12} = -41.9424$ | | | |
| | $d_{12} = D_2$ (variable) | | |
| $r_{13} = \infty$ | | | |
| | $d_{13} = 0.6000$ | $n_7 = 1.51633$ | $\nu_7 = 64.15$ |
| $r_{14} = \infty$ | | | |

| f | W | S | T |
|---|---|---|---|
| $D_1$ | 16.492 | 7.639 | 1.000 |
| $D_2$ | 4.894 | 7.710 | 11.932 |

-continued

| Embodiment 4 | | | |
|---|---|---|---|
| $f = 10\sim10$ mm, F/4~F/5  $2\omega = 46°\sim24°$ | | | |

$D/f_{II}4 = 0.32$, $l_{II}/f_{II} = 1.13$
$(r_b + r_a)/(r_b - r_a) = 0.36$ angle of incidence of principal ray on image surface at maximum field angle 9.2°~7.3°

Figure 5:
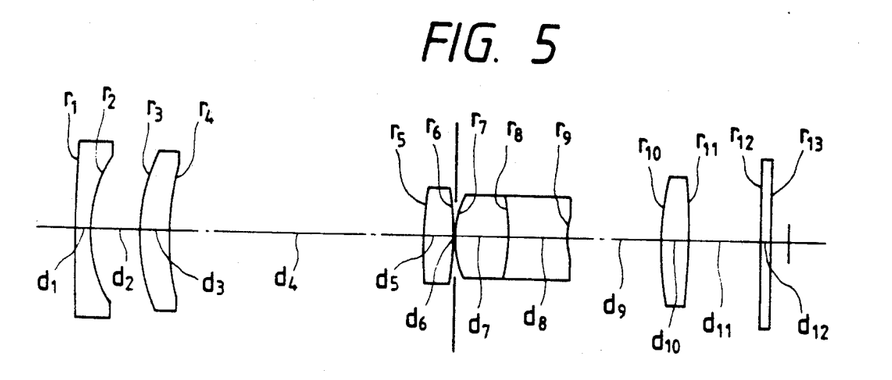

| Embodiment 5 | | | |
|---|---|---|---|
| $f = 10\sim20$ mm, F/4~F/5.5  $2\omega = 46°\sim24°$ | | | |
| $r_1 = 219.5134$ | | | |
| | $d_1 = 1.0000$ | $n_1 = 1.77250$ | $\nu_1 = 49.66$ |
| $r_2 = 9.6400$ | | | |
| | $d_2 = 3.0363$ | | |
| $r_3 = 11.9470$ | | | |
| | $d_3 = 1.9000$ | $n_2 = 1.80518$ | $\nu_2 = 28.43$ |
| $r_4 = 17.7744$ | | | |
| | $d_4 = D_1$ (variable) | | |
| $r_5 = 22.3008$ | | | |
| | $d_5 = 1.9000$ | $n_3 = 1.75700$ | $\nu_3 = 47.87$ |
| $r_6 = -21.5575$ | | | |
| | $d_6 = 0.2000$ | | |
| $r_7 = 7.6777$ (pupil) | | | |
| | $d_7 = 3.4103$ | $n_4 = 1.53172$ | $\nu_4 = 48.90$ |
| $r_8 = -14.6228$ | | | |
| | $d_8 = 3.7264$ | $n_5 = 1.78472$ | $\nu_5 = 25.71$ |
| $r_9 = 5.7788$ | | | |
| | $d_9 = 5.9343$ | | |
| $r_{10} = 18.1354$ | | | |
| | $d_{10} = 1.9000$ | $n_6 = 1.77250$ | $\nu_6 = 49.66$ |
| $r_{11} = -41.9515$ | | | |
| | $d_{11} = D_2$ (variable) | | |
| $r_{12} = \infty$ | | | |
| | $d_{12} = 0.6000$ | $n_7 = 1.51633$ | $\nu_7 = 64.15$ |
| $r_{13} = \infty$ | | | |

| f | W | S | T |
|---|---|---|---|
| $D_1$ | 16.359 | 7.582 | 1.000 |
| $D_2$ | 4.586 | 7.532 | 11.951 |

$D/f_{II}4 = 0.36$, $l_{II}/f_{II} = 1.13$
$(r_b + r_a)/(r_b - r_a) = 0.40$ angle of incidence of principal ray on image surface at maximum field angle 9.2°~7.0°

Figure 6:
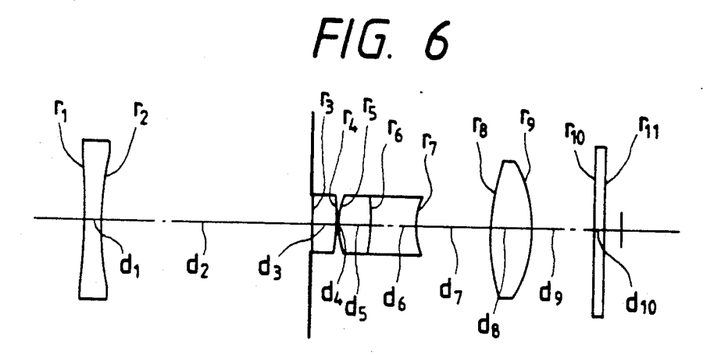
Figure 7:
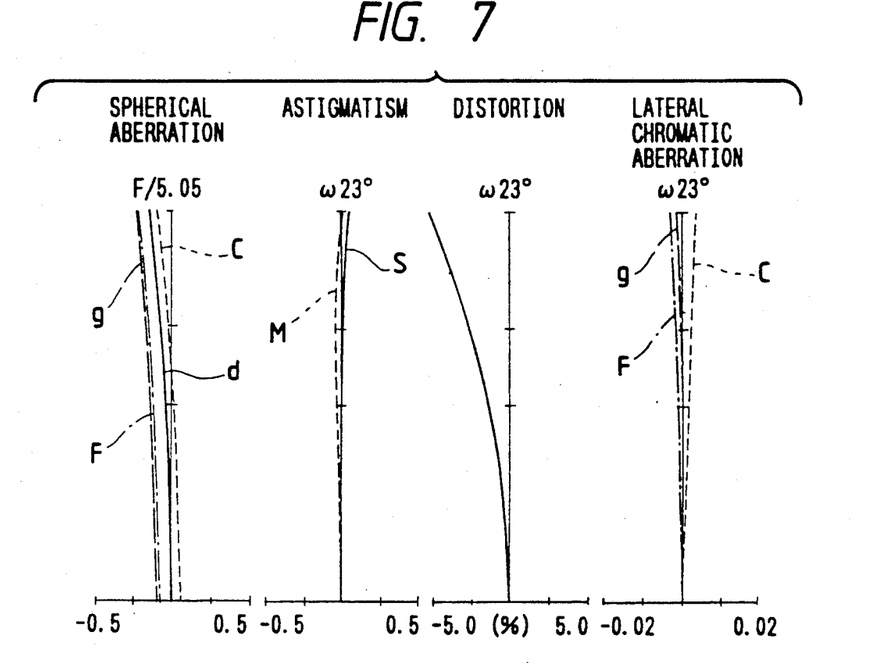
FIG. 7, FIG. 8 and FIG. 9 show graphs illustrating aberration characteristics at the wide position, intermediate focal length and tele position, respectively, of the Embodiment 1 of the present invention.
Figure 8:
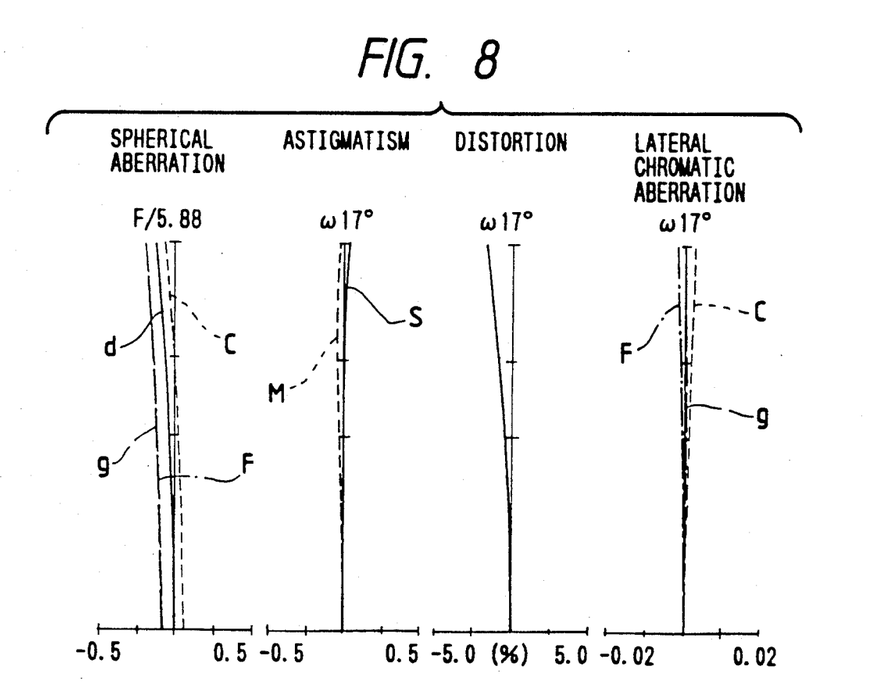
Figure 9:
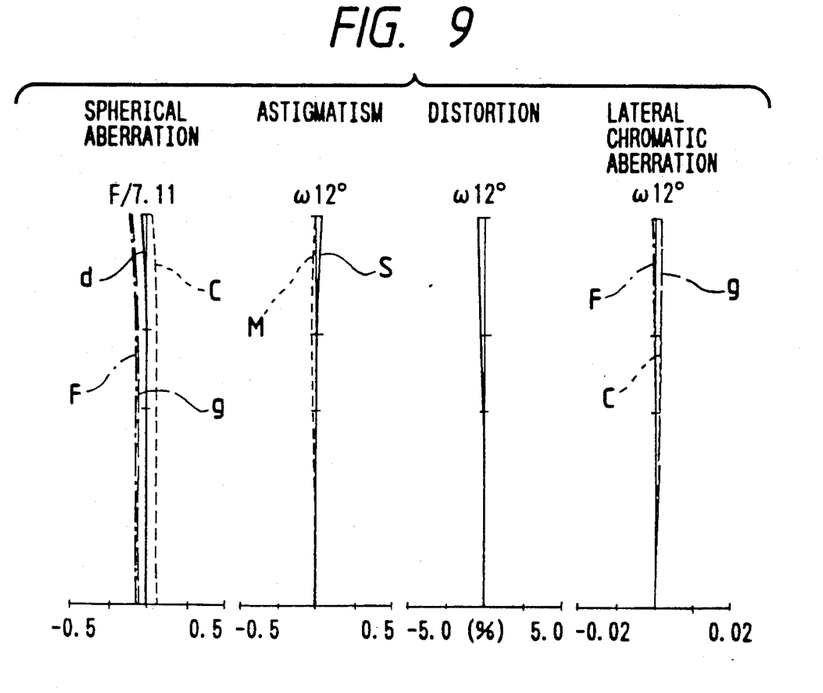
Figure 10:
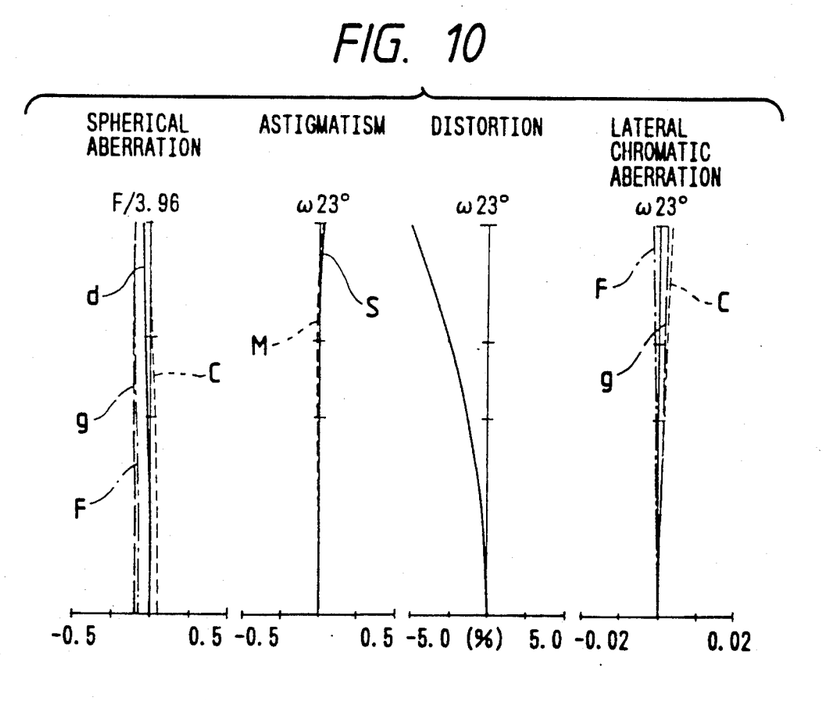
FIG. 10, FIG. 11 and FIG. 12 show graphs illustrating aberration characteristics at the wide position, intermediate focal length and tele position, respectively, of Embodiment 2 of the present invention.
Figure 11:
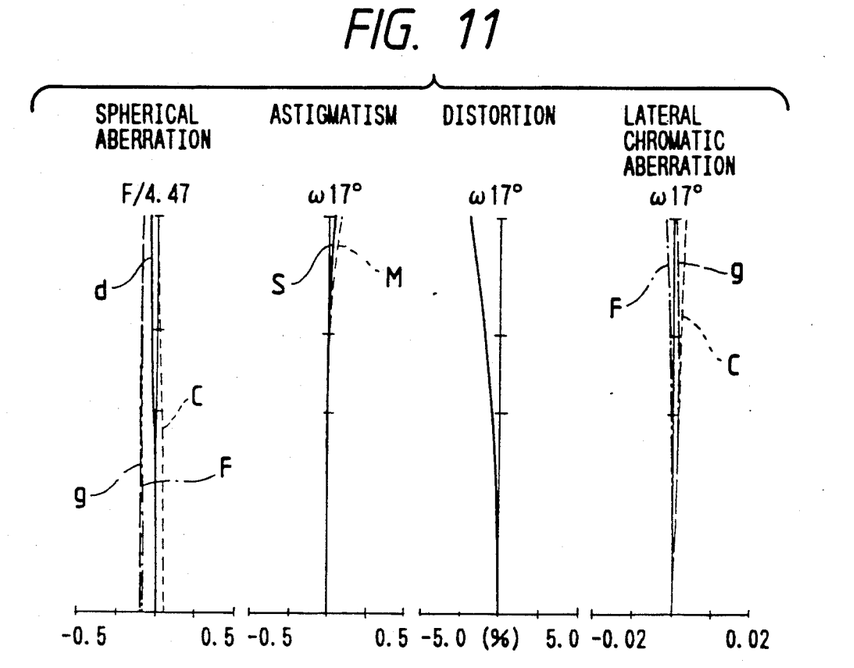
Figure 12:
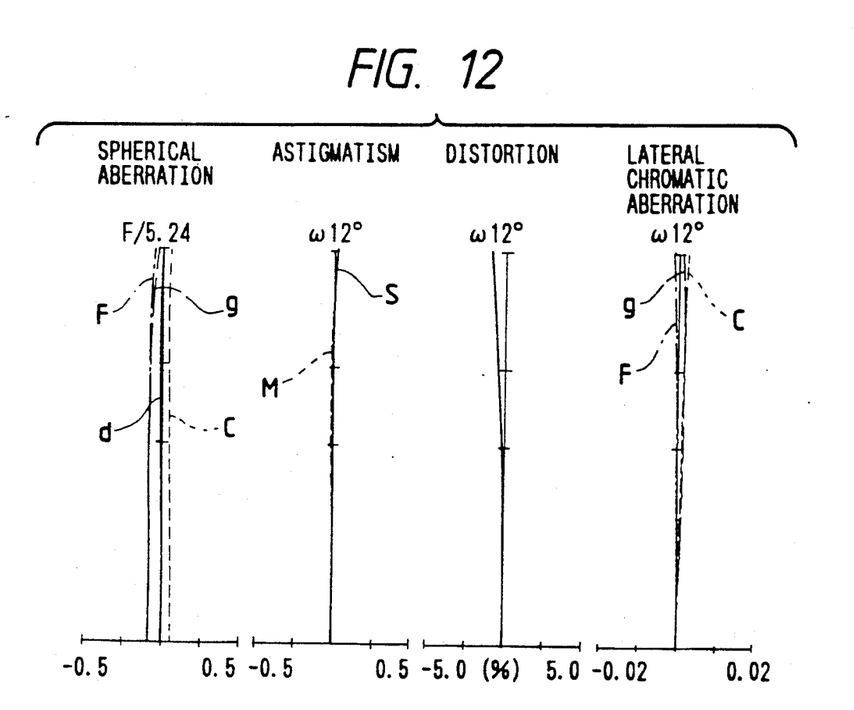
Figure 13:
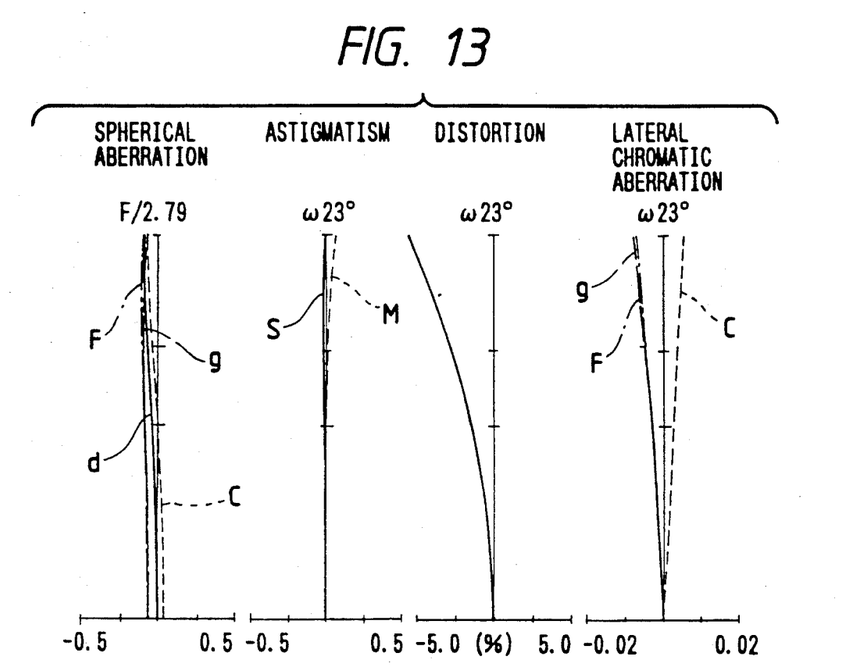
FIG. 13, FIG. 14 and FIG. 15 show curves illustrating aberration characteristics at the wide position, intermediate focal length and tele position, respectively, of Embodiment 3 of the present invention.
Figure 14:
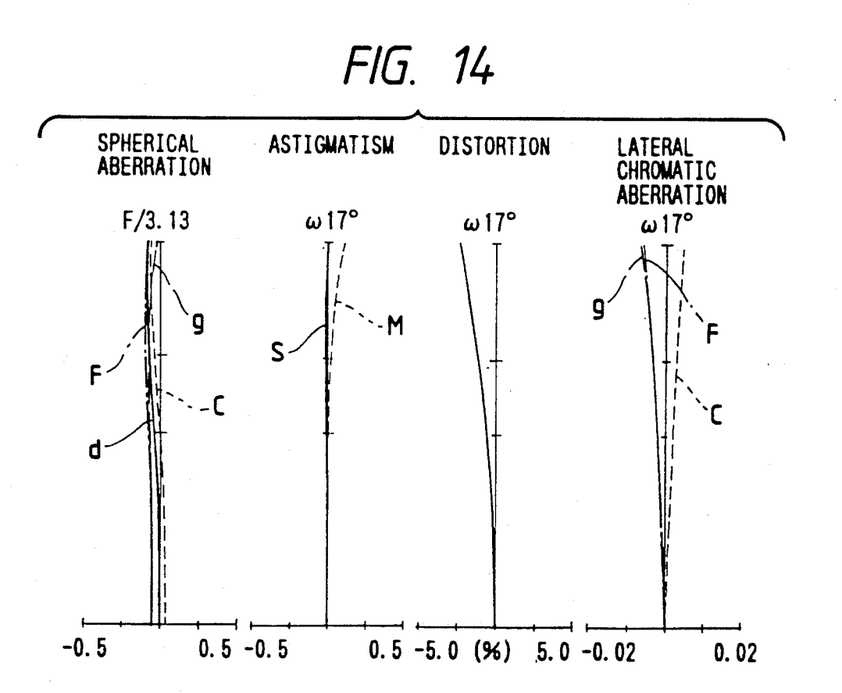
Figure 15:
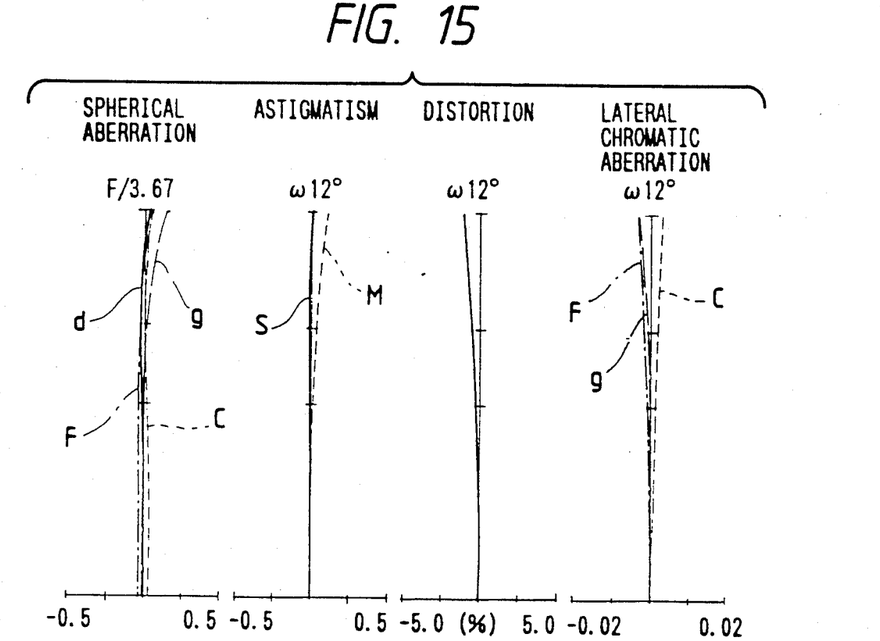
Figure 16:
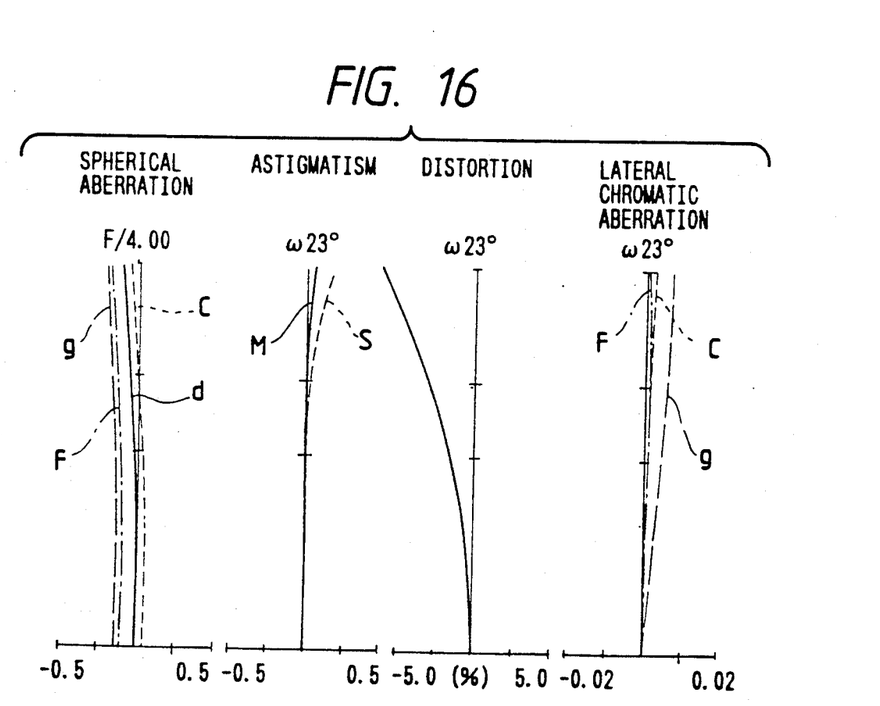
FIG. 16, FIG. 17 and FIG. 18 show curves illustrating aberration characteristics at the wide position, intermediate focal length and tele position respectively of Embodiment 4 of the present invention.
Figure 17:
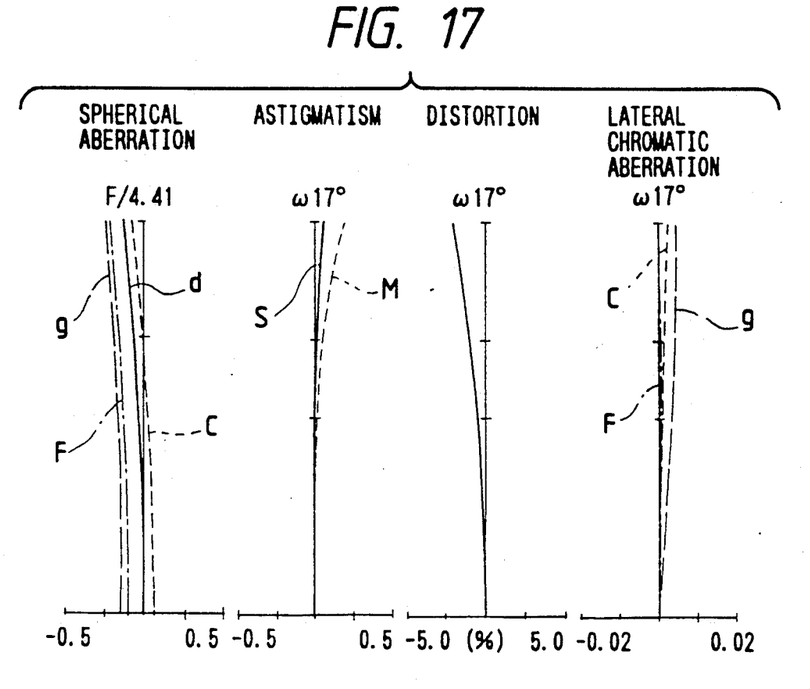
Figure 18:
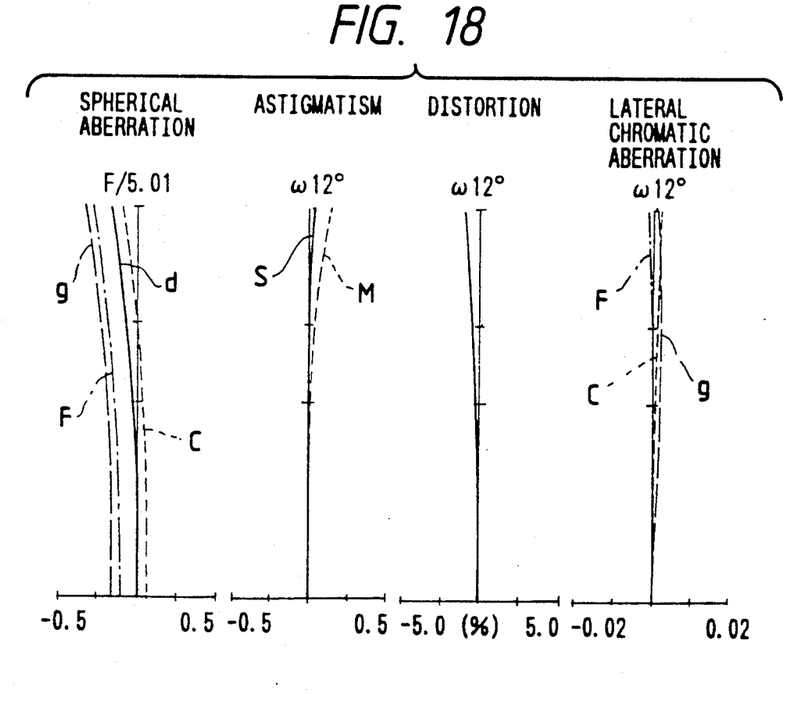
Figure 19:
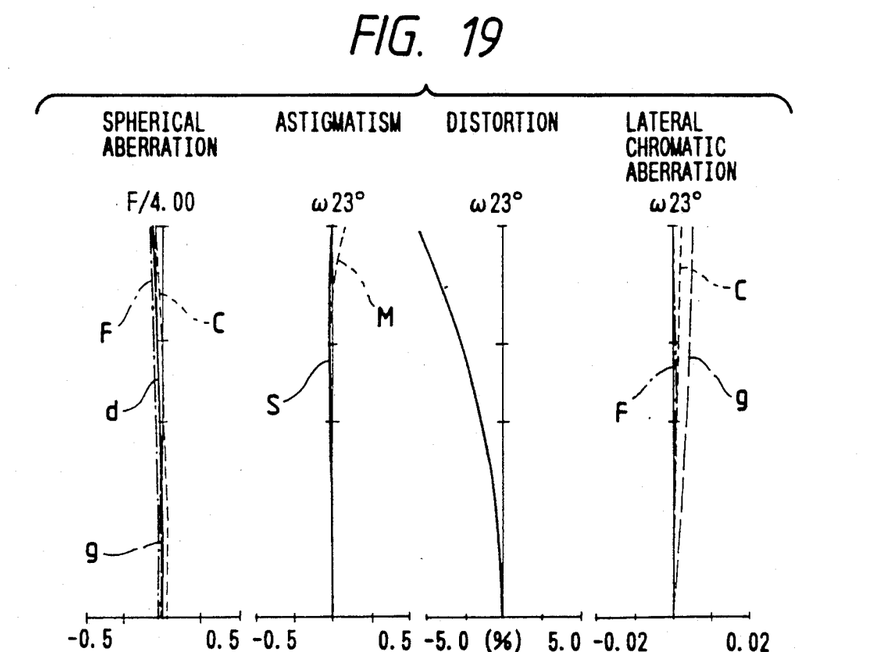
FIG. 19, FIG. 20 and FIG. 21 show graphs visualizing aberration characteristics at the wide position, intermediate focal length and tele position, respectively, of Embodiment 5 of the present invention.
Figure 20:
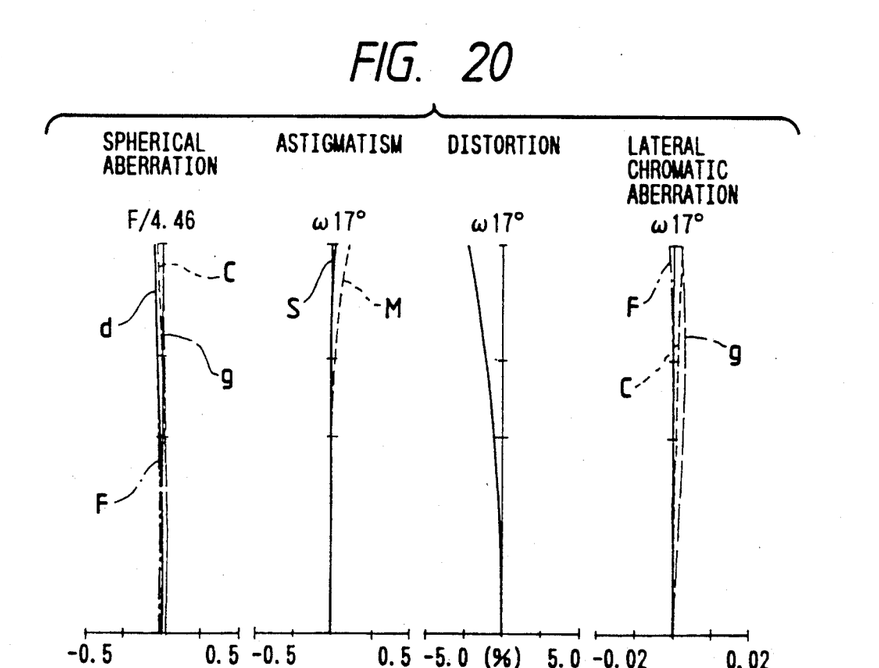
Figure 21:
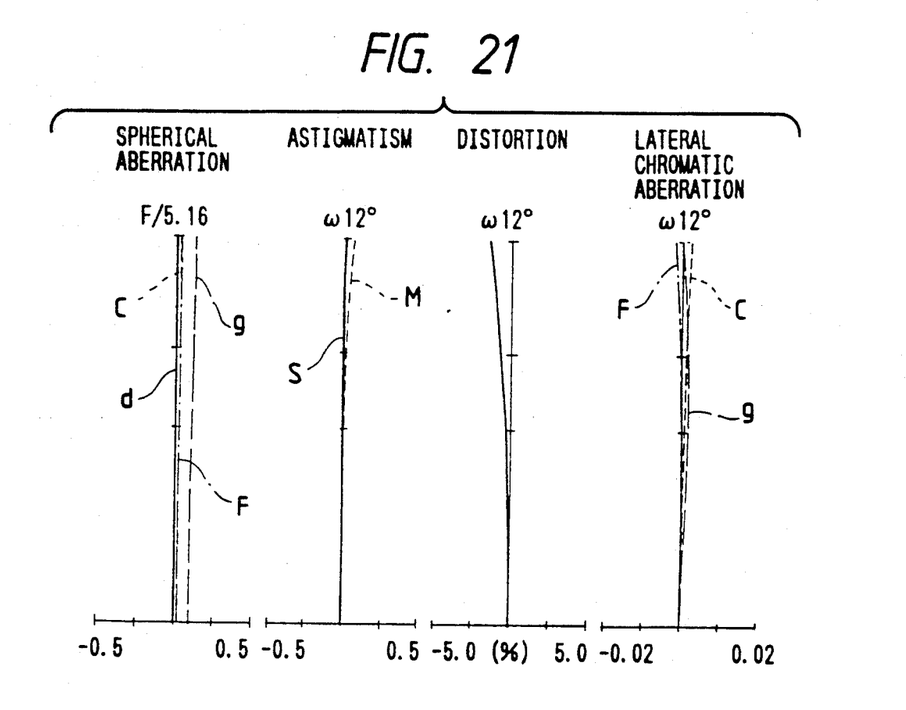
Figure 22:
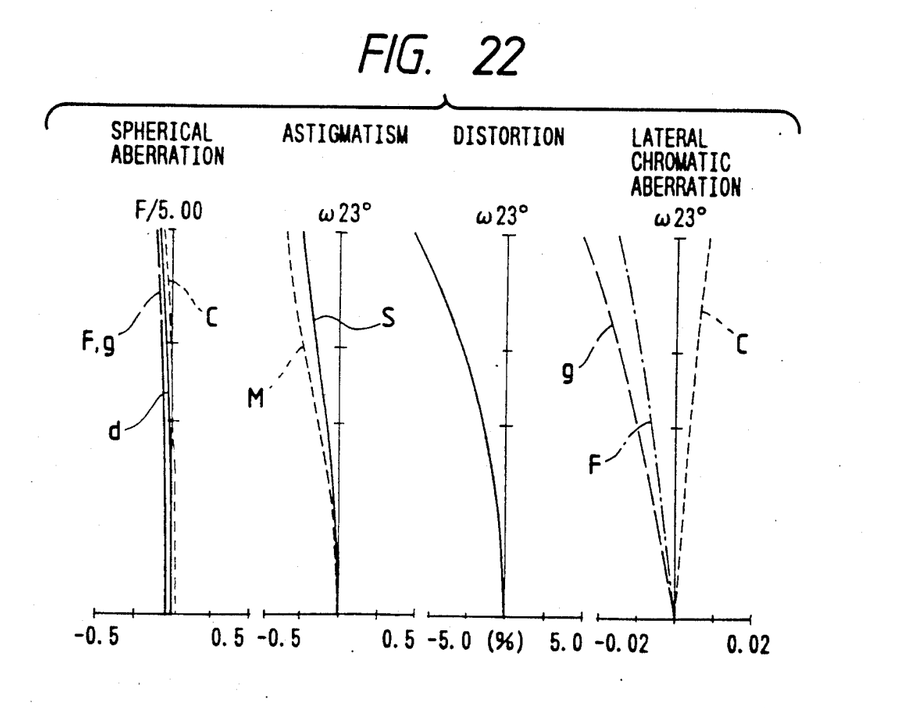
FIG. 22, FIG. 23 and FIG. 24 show curves visualizing aberration characteristics at the wide position, intermediate focal length and tele position, respectively, of Embodiment 6 of the present invention.
Figure 23:
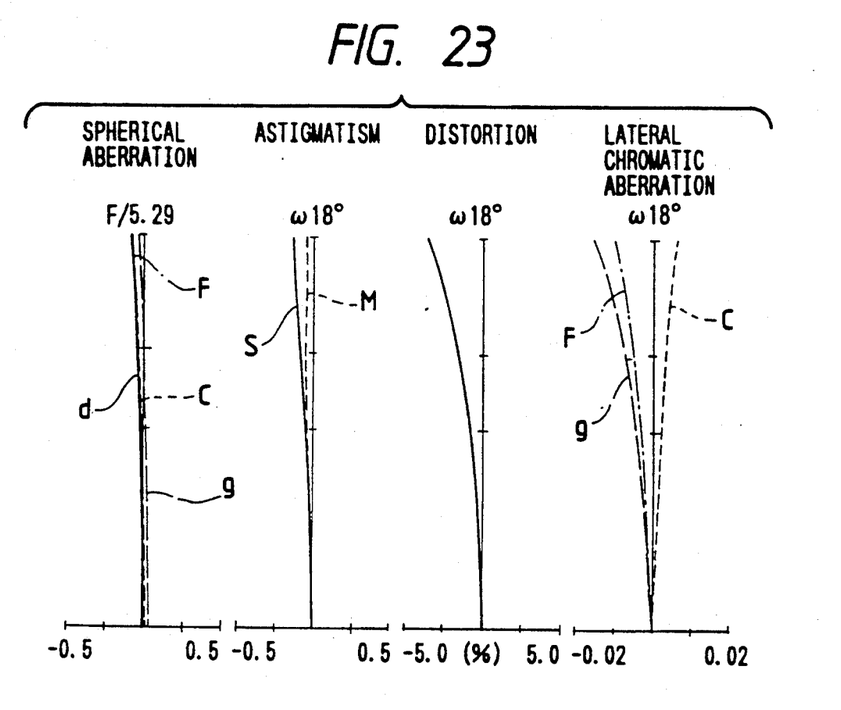
Figure 24:
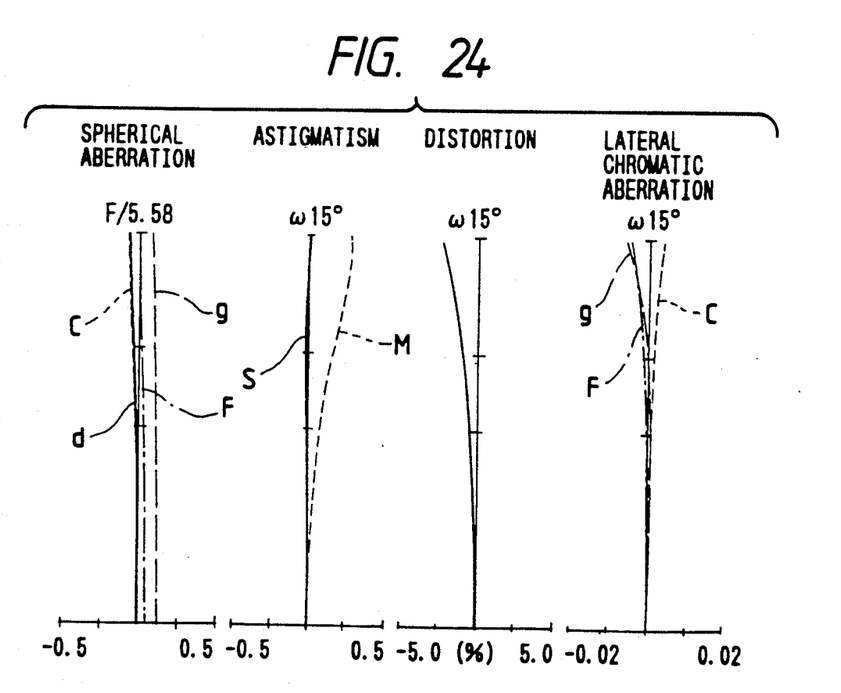

| Embodiment 6 | | | |
|---|---|---|---|
| $f = 10\sim16$ mm, F/5~F/5.6  $2\omega = 23°\sim15°$ | | | |
| $r_1 = -71.2395$ | | | |
| | $d_1 = 1.0000$ | $n_1 = 1.69680$ | $\nu_1 = 55.52$ |
| $r_2 = 19.1004$ | | | |
| | $d_2 = D_1$ (variable) | | |
| $R_3 = 15.5237$ (pupil) | | | |
| | $d_3 = 1.6000$ | $n_2 = 1.79952$ | $\nu_2 = 42.24$ |
| $r_4 = -27.6412$ | | | |
| | $d_4 = 0.2000$ | | |
| $r_5 = 6.0233$ | | | |
| | $d_5 = 1.9912$ | $n_3 = 1.57309$ | $\nu_3 = 42.57$ |
| $r_6 = -25.2015$ | | | |
| | $d_6 = 3.0292$ | $n_4 = 1.80518$ | $\nu_4 = 25.43$ |
| $r_7 = 4.1977$ | | | |
| | $d_7 = 4.7622$ | | |
| $r_8 = 13.9759$ | | | |
| | $d_8 = 2.7000$ | $n_5 = 1.48749$ | $\nu_5 = 70.20$ |
| $r_9 = -9.5957$ | | | |
| | $d_9 = D_2$ (variable) | | |
| $r_{10} = \infty$ | | | |
| | $d_{10} = 0.6000$ | $n_6 = 1.51633$ | $\nu_6 = 64.15$ |
| $r_{11} = \infty$ | | | |

| f | W | S | T |
|---|---|---|---|
| $D_1$ | 13.616 | 7.075 | 2.987 |
| $D_2$ | 3.996 | 5.835 | 7.674 |

$D/f_{II}4 = 0.39$, $l_{II}/f_{II} = 1.08$

-continued

Embodiment 6 f = 10~16 mm, F/5~F/5.6  2ω = 23°~15°

$(r_b + r_a)/(r_b - r_a) = -0.19$ angle of incidence of principal ray on image surface at maximum field angle 7.7°~6.8° wherein the reference symbols $r_1, r_2, \ldots$ represent the radii of curvature on the surfaces of the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements, and the reference symbols $\nu_1, \nu_2, \ldots$ represent the Abbe's numbers on the respective lens elements.

In each of these embodiments, the plane parallel plate arranged after the photographic lens is used as a protective glass plate 1 for a CCD 2. Further, the reference symbols W, S and T used in the numerical data represent the wide position, intermediate focal length and tele position of the zoom lens system.

The zoom lens systems preferred as the Embodiments of the present invention have field angles on the order of 46° at the wide positions thereof, vari-focal ratios on the order of 1.6 to 2, exit pupils located at positions sufficiently far from the image surfaces, simple compositions and favorably corrected aberrations.

I claim:

1. A zoom lens system for electronic photography comprising, in order from the object side:
    a front lens unit having a negative refractive power as a whole;
    a rear lens unit having a positive refractive power as a whole; and
    an electronic image pickup device disposed on an image surface formed by said front lens unit and said rear lens unit;
    wherein said rear lens unit comprises a first positive lens element, a second positive lens element having a convex surface on the image side, a third biconcave lens element and a fourth biconvex lens element;
    wherein said second lens element and said third lens element are cemented to each other so as to compose a cemented doublet,
    wherein said zoom lens system varies focal length by varying an airspace reserved between said front lens unit and said rear lens unit; and
    wherein said zoom lens system satisfies the following condition (1):

$$0.19 < D/f_{II4} < 0.7 \tag{1}$$

wherein the reference symbol D represents an airspace reserved between the third lens element and the fourth lens element, and the reference symbol $f_{II4}$ designates the focal length of the fourth lens element.

2. A zoom lens system according to claim 1 satisfying the following condition (2):

$$0.87 < l_{II}/f_{II} < 1.6 \tag{2}$$

wherein the reference symbol $l_{II}$ represents the distance as measured from the object side surface of the first lens element to the image side surface of the fourth lens element arranged in said rear lens unit and the reference symbol $f_{II}$ designates the focal length of said rear lens unit.

3. A zoom lens system according to claim 2 wherein the fourth lens element satisfies the following condition (3):

$$-0.8 < (r_b + r_a)/(r_b - r_a) < 1 \tag{3}$$

wherein the reference symbols $r_a$ and $r_b$ represent the radii of curvature on the object side surface and the image side surface respectively of the fourth lens element.

4. A zoom lens system comprising, in order from the object side:
    a front lens unit having a negative refractive power as a whole; and
    a rear lens unit having a positive refractive power as a whole; and
    wherein said rear lens unit comprises a first positive lens element, a second positive lens element having a convex surface on the image side, a third biconcave lens element and a fourth biconvex lens element;
    wherein said second lens element and said third lens element are cemented to each other so as to compose a cemented doublet,
    wherein said zoom lens system varies focal length by varying an airspace reserved between said front lens unit and said rear lens unit; and
    wherein said zoom lens system satisfies the following condition (1):

$$0.19 < D/f_{II4} < 0.7 \tag{1}$$

wherein the reference symbol D represents an airspace reserved between the third lens element and the fourth lens element, and the reference symbol $f_{II4}$ designates the focal length of the fourth lens element.

5. A zoom lens unit having a negative refractive power as a whole; and
    a rear lens unit having a positive refractive power as a whole; and
    wherein said rear lens unit comprises a first positive lens element, a second positive lens element having a convex surface on the image side, a third biconcave lens element and a fourth biconvex lens element;
    wherein said second lens element and said third lens element are cemented to each other so as to compose a cemented doublet
    wherein said zoom lens system varies focal length by varying an airspace reserved between said first lens unit and said rear lens unit; and
    wherein said zoom lens system satisfies the following conditions (1) and (2):

$$0.16 < D/f_{II4} < 0.7 \tag{1}$$

$$0.87 < f_{II}/f_{II} < 1.6 \tag{2}$$

wherein the reference symbol D represents an airspace reserved between the third lens element and the fourth lens element, the reference symbol $f_{II4}$ designates the focal length of the fourth lens element, the reference symbol $l_{II}$ represents the distance as measured from the object side surface of the first lens element to the image side surface of the fourth lens element disposed in said rear lens unit and the reference symbol $f_{II}$ designates the focal length of said rear lens unit.

6. A zoom lens system according to claim 5, wherein the fourth lens element satisfies the following condition (3):

$$-0.8 < (r_b + r_a)/(r_b - r_a) < 1 \quad (3)$$

wherein the reference symbols $r_a$ and $r_b$ represent the radii of curvature on the object side surface and the image side surface respectively on the fourth lens element.

* * * * *